United States Patent [19]

Wortman

[11] Patent Number: 5,069,402
[45] Date of Patent: Dec. 3, 1991

[54] ALLEVIATION OF AIRCRAFT FUSELAGE FORM DRAG

[75] Inventor: Andrew Wortman, Santa Monica, Calif.

[73] Assignee: ISTAR, Inc., Santa Monica, Calif.

[21] Appl. No.: 505,602

[22] Filed: Apr. 6, 1990

[51] Int. Cl.$^5$ ................................................. B64 23/06
[52] U.S. Cl. ................................... 244/130; 244/199; 244/91
[58] Field of Search ................. 244/199, 200, 213, 91, 244/130

[56] References Cited

U.S. PATENT DOCUMENTS

| 2,650,752 | 9/1953 | Hoadley | 244/130 |
| 2,960,286 | 11/1960 | Louthau | 244/91 |
| 3,419,232 | 12/1968 | McStay et al. | |
| 4,569,494 | 2/1986 | Sakata | 244/199 |
| 4,836,473 | 6/1989 | Aulehla et al. | 244/130 |

FOREIGN PATENT DOCUMENTS 3523715 1/1987 Fed. Rep. of Germany ........ 244/91

OTHER PUBLICATIONS

Pearcey, H. H., "Shock Induced Separation and Its Prevention by Design and Boundary Layer and Flow Control", in Lochmann, G. V., ed., *Boundary and Flow Control—Its Principals and Applications*, pp. 1277–1285, Pergamon Press, Oxford, 1961.
"Afterbody Drag Reduction by Vortex Generators", by W. Calarese, et al., Paper presented at AIAA 23rd Aerospace Sciences Meeting, Reno, NV, Jan. 1985.

Primary Examiner—Galen Barefoot
Attorney, Agent, or Firm—Kirk & Lindsay

[57] ABSTRACT

An aircraft having an upswept tail section fuselage includes a single pair of large vortex generators mounted in the vicinity of the break in the fuselage ahead of or at the beginning of the tail upsweep, each vortex generator being mounted on a side of and adjacent the bottom of the fuselage. The vortex generators, which may be plates or fins, develop strong transverse outflow from the vertical plane of symmetry that relieves or delays the tendency to flow separation by acting on the external flow field while at the same time energizing the boundary layer to increase its resistance to separation. The vortex generator may be thin or slightly thickened, flat or airfoil shaped, and may have triangular, straight, tapered, or reverse tapered planforms and may be rigid or flexible. Either one or both edges may be blunted, although sharp edges are preferred.

14 Claims, 2 Drawing Sheets

FIG.6 FIG.7
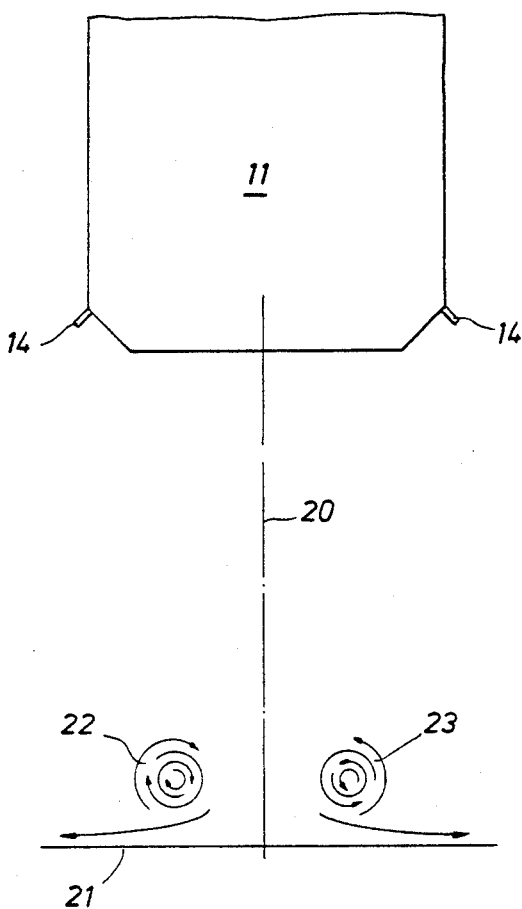
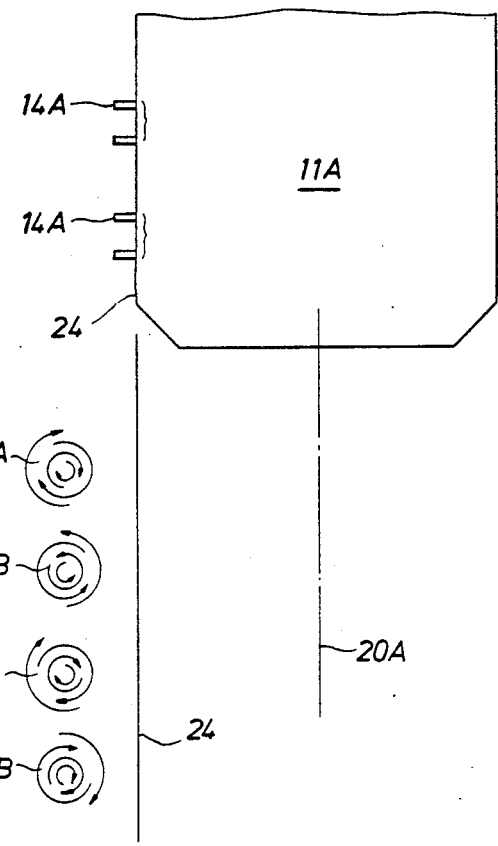
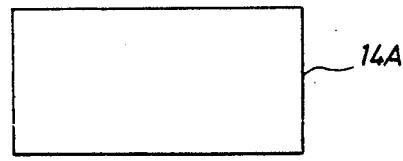
FIG.8A
FIG.8B
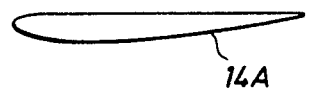

ALLEVIATION OF AIRCRAFT FUSELAGE FORM DRAG

FIELD OF THE INVENTION

The present invention generally concerns aircraft fuselage form drag-reduction using vortex flows. More particularly, the invention concerns using such vortex flows to alleviate aircraft fuselage form drag on aircraft having an upswept tail section fuselage in which the surface of the upswept tail section produces a flow separation with a drag-creating, trailing vortex on each side of that surface.

DESCRIPTION OF THE PRIOR ART

Operating economy of military and civilian aircraft is being increasingly affected by the rising costs of fuel. Aircraft shapes are optimized for economy, subject to operational requirements, through extensive wind tunnel and flight tests. Transport aircraft generally follow the form developed long ago in having a wing, a fuselage, and empennage. The volume of the fuselage is determined by cargo or passenger load requirements with the overall length being fixed by operational considerations and aerodynamic efficiency. The aft ends of a transport aircraft fuselage is tapered asymmetrically to some minimum base area with a pronounced upsweep of the bottom contour to facilitate rotation in the pitch plane on landing and take off. The upsweep of the fuselage contour is more pronounced in aft-loading aircraft such as the C-130, C-141, C5, or CASA 212. Because of the fuselage upsweep and the rapid decrease of the fuselage cross-sectional area, a strong adverse longitudinal pressure gradient is established. At the same time, the transverse pressure gradients induce inflow into the vertical plane of symmetry. Consequently, the boundary layer on the fuselage grows very rapidly and may separate so that a large volume of low energy flow is established around the fuselage resulting in very high momentum defect in the wake and an increase of the fuselage form drag.

Aircraft designs are being continuously refined to enhance aircraft performance and operating economy. When the basic performance and operating requirements are defined, the configurations of the basic components are essentially fixed and only minor shape modifications or additions of appendages are allowed.

One approach is the use of vortices to energize the boundary layer and to modify the outer inviscid flow. Attention has focused on aircraft wings. An excellent survey of methods for energizing boundary layers to delay or prevent flow separation is given by Pearcey (Pearcey, H. H., "Shock Induced Separation and Its Prevention by Design and Boundary Layer and Flow Control" in Lachmann, G. V., Ed, *Boundary Layer and Flow Control-Its Principals and Applications,* Pergamon Press, Oxford, 1961.) An example of boundary layer control by means of relatively small vortices is the location of "vortex generator farms" on Boeing 707 aircraft. Large scale vortices on fighter aircraft are generated by means of canards, chines, leading edge extensions, or leading edge discontinuities. Small vanes on the forward parts of the projecting DC-10 engine nacelles is another example of using vortex generators to control the boundary layers on aircraft wings.

Aircraft fuselages have received less attention and, particularly, fuselages having upswept tails. On highly upswept tails of aft-loading transport aircraft, the flow instabilities caused by flow separation and vortex shedding have been alleviated through the use of sharp training edges and longitudinal strips, but at the expense of increased drag.

U.S. Pat. No. 3,419,232, issued to McStay et al, is also directed to reduction of drag on fuselages with upswept tails. That patent positions two spaced-apart fairings (vertically disposed, flat, sharp-edged, triangular strakes or fins) on the upswept surface of an aircraft's tail section, each in close proximity to a trailing vortex, to displace and interfere with that vortex and, thereby, reduce drag created by the vortex; the fairings are used to displace the natural vortices.

A paper entitled "Afterbody Drag Reduction by Vortex Generators" by W. Calarese, W. P. Crisler, and G. L. Gustafson presented at the AIAA 23rd Aerospace Sciences Meeting, Jan. 14–17, 1985 in Reno, Nev. suggests using large vortex generators mounted in pairs on the sides of the fuselage, not single vortex generators on each side of and near the bottom of the fuselage in accordance with the present invention. Also, the paper suggests using small vortex generators arranged in a linear or curved array on the sides of the fuselage. The aim of both of these arrangements is to energize the boundary layer, not to influence the main flow in the lower aft regions of the fuselage.

SUMMARY OF THE INVENTION

On an aircraft having a fuselage with an upswept tail section, the present invention positions a single vortex generator adjacent the beginning of the tail upsweep on each side and near the bottom of the fuselage to develop strong transverse outflows from the plane of symmetry and, thereby, relieve the tendency to flow separation by acting on the external flow field while at the same time energizing the boundary layer to increase its resistance to separation. The configuration, size, and pitch of the vortex generators are selected to optimize reduction of fuselage form drag. None of the prior art concepts for reducing drag on aircraft is structurally or operationally similar to the structure and operation of the present invention.

It is known that the boundary layer on the upswept part of the fuselage is highly three-dimensional because of the strong retarding axial pressure grading and inflow towards the vertical plane of symmetry. In three-dimensional flows, relatively minor inflow towards the plane of symmetry leads to boundary layer separation at magnitudes of longitudinal adverse pressure gradients which are far below those observed in two-dimensional flows, or on wings. Conversely, small outflow from the plane of symmetry increases the resistance to flow separation dramatically. Consequently, rather than merely energizing the boundary layer with an array of small vortex generators or large vortex generators along the sides of the fuselage, it is more advantageous to generate two vortices; one on each side of the fuselage near the bottom thereof. The vortices thus generated have axial and tangential velocity components which not only energize the boundary layer and thus increase its resistance to separation, but also create a favorable transverse outflow which relieves the adverse pressure gradients causing separation.

On the basis of extensive wind tunnel experiments, referred to later herein, it is concluded that the vortex generators should be located in the region close to the point on the fuselage where the tail upsweep begins.

Test data indicate that significant drag reductions can be achieved when the vortex generators are placed slightly ahead or down stream of the fuselage breakline.

BRIEF DESCRIPTION OF THE DRAWINGS

FIG. 6 is a schematic view of a fuselage, vortex generators and induced outflow on the fuselage bottom in accordance with the invention;

FIG. 7 is a schematic view of a fuselage, vortex generators and vortices developed on the sides of the fuselage in accordance with one prior art suggestion;

FIG. 8A is a side view planform of the vortex generator of FIG. 7 and

FIG. 8B is a plan view of the vortex generator of FIG. 7.

DESCRIPTION OF THE PREFERRED EMBODIMENTS

Figure 1:
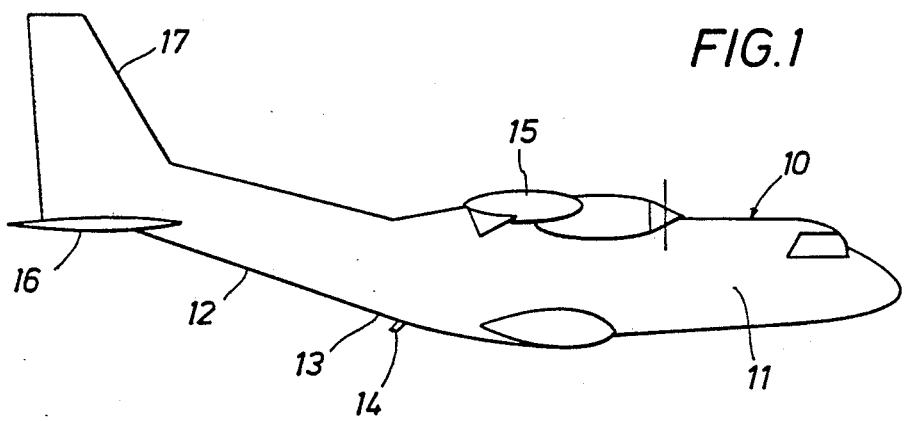
FIG. 1 is a side view of an airplane with an upswept tail section fuselage and showing one of a pair of vortex generators located near the break in the fuselage and near the bottom of the fuselage.
Figure 2:
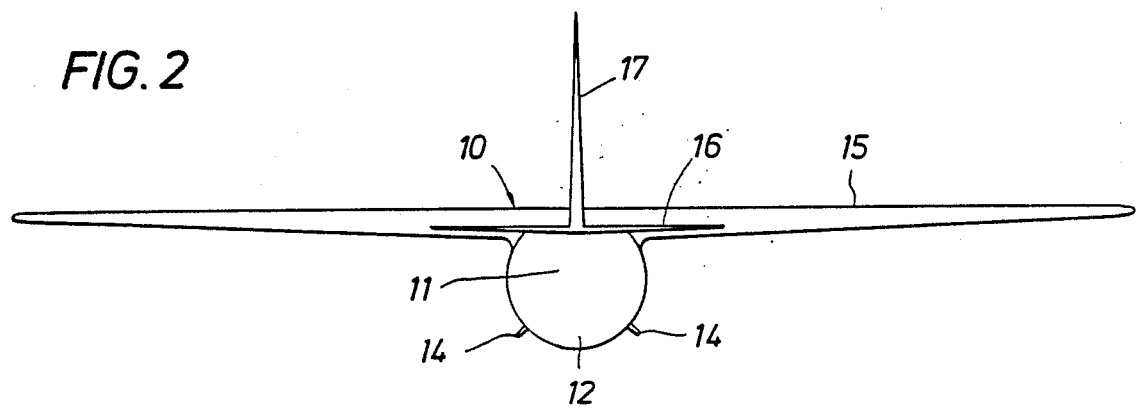
FIG. 2 is a rear view of the airplane shown in FIG. 1, showing the pair of vortex generators on the fuselage.

Referring to FIGS. 1 and 2, there is shown an airplane 10 having a fuselage 11 with an upswept rear section 12 beginning at break 13. A pair of vortex generators 14 are attached to fuselage 11 near break 13. Also shown are wing 15 and horizontal and vertical stabilizers 16 and 17, respectively.

Figure 3:
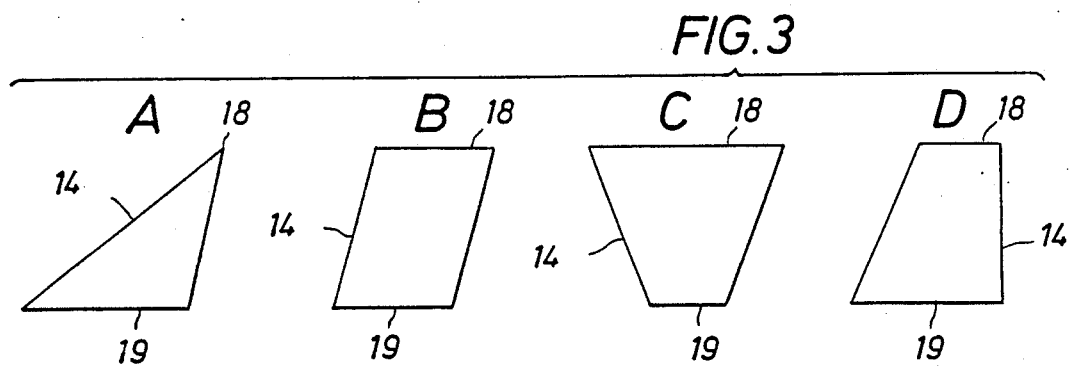
FIGS. 3A, 3B, 3C, and 3D are side view planforms of differently configured vortex generators.
Figure 4:
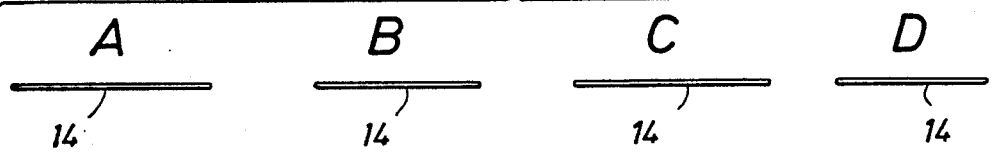
FIGS. 4A, 4B, 4C, and 4D are plan views of the vortex generators of FIGS. 3A, 3B, 3C, and 3D, respectively.
Figure 5:
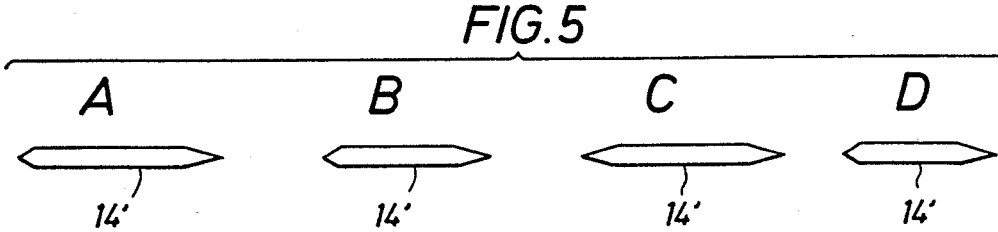
FIGS. 5A, 5B, 5C, and 5D are plan views of modified vortex generators of the vortex generators illustrated in 3A, 3B, 3C, and 3D, respectively.

FIGS. 3A, 3B, 3C, and 3D and FIGS. 4A, 4B, 4C, and 4D show four differently sized and configured vortex generators 14. Vortex generators 14 of FIGS. 4A-D, as indicated, are flat, sharp-edged plates or fins that preferably extend substantially vertically from the surface of the fuselage. FIGS. 3A and 4A show a triangular planform, FIGS. 3B and 4B show a straight planform, FIGS. 3C and 4C show a reverse tapered planform and FIGS. 3D and 4D show a tapered planform. Each of the fins 14 has an upper root portion 18 attachable to the fuselage 11 and a lower tip portion 19, as indicated in FIGS. 3A-3D. The type fins of FIGS. 3B, 4B, and 3C, 4C, and 3D, 4D were the vortex generator planforms used in the tests referred to herein.

The vortex generators 14' of FIGS. 5A, 5B, 5C, and 5D are also sharp-edged on the forward and rear edges but are thicker in cross-section than the thin vortex generators 14 of FIGS. 4A, 4B, 4C, and 4D.

The vortices generated by positioning the fins at the upsweep breakline near the bottom of the aircraft are diagrammatically illustrated in FIG. 6 where there are shown fuselage 11 and a fuselage centerline, indicated at 20, and a fuselage bottom, indicated at 21. Each vortex generator 14 positioned adjacent the break 13 in fuselage 11 develops induced outflow counter-rotating vortices 22 and 23 that act all along the fuselage centerline 20 where the flow separation is most likely to occur. The induced outflow relieves the boundary layer in the most sensitive region. FIG. 7 and FIGS. 8A and 8B diagrammatically illustrate the vortices generated by Calarese et al in their aforementioned paper in which individual vortex generators 14A are positioned in pairs along the side 24 of a fuselage 11A having a centerline 20A. The counter-rotating vortices 22A, 22B, and 23A, 23B induce outflow on the sides of the fuselage 11A, but some of that outflow will be cancelled because the pairs of vortices are in close proximity. Each individual fin's planform 14A of the pairs of vortex generators is depicted in FIGS. 8A and 8B, where the fins are shown to have airfoil shapes.

Both the vortices generated by the present invention and the vortices generated by the Calarese et al approach energize the boundary layer, but the present invention also acts on the outer flow to induce favorable transverse pressure gradients at the flow centerline.

The rows of small vortex generators suggested in the Calabrese et al paper serve solely to energize the boundary layer flow and are analogous to the "vortex generator farms" seen in any jet transport's wings.

The vortex generators of this invention being located ahead or at the beginning of the fuselage upsweep function not only to energize the boundary layer and thus increase the boundary layer's resistance to separation, but also to generate boundary layer transverse flow which delays flow separation.

Extensive wind tunnel results were conducted on models of Boeing 747 and Lockheed C-5 fuselages to validate the concept of alleviating aircraft fuselage form drag by attaching a single pair of large vortex generators, one on each side of the fuselage near the bottom and near the upsweep break of the fuselage to influence the inviscid flow and the boundary layer. The principal parameters in the tests were (1) vortex generator configuration, (2) vortex generator size, (3) location of the vortex generator, and (4) pitch angle of the vortex generator. Fuselage drag reductions of 3% for the Boeing 747 and 6% for the Lockheed C-5 were realized in those tests. These wind tunnel tests also indicated that on aircraft of the size of the Boeing 747 and the Lockheed C-5, the vortex generators should have a span (root-to-tip extent) of about 2 feet at a station where the approximately 200-foot-long fuselages have effective diameters of 20 to 30 feet. Optimum sizes and configurations for specific aircraft can be determined in wind tunnel and flight test programs. Preferably each fin has a 2- to 4-foot span and is about 2 square feet in area.

The test results do not necessarily represent the absolute maxima because of the limited number of configurations, sizes, locations and pitch angles that could be tested. It is likely that greater drag reduction would be found with additional vortex configurations and locations. Again, optimum locations on particular aircraft designs can be determined in wind tunnel tests and confirmed at full scale in a flight test and certification programs. The exact location will also be influenced to some extent by structural considerations, since it may be convenient to attach the vortex generators to a major structural member in the general area determined by aerodynamic considerations.

The data from the tests show that similar results were achieved by differently configured vortex generators in different locations. As indicated in FIGS. 3A-D, 4A-D, 5A-D, and 8A-B, the vortex generators may assume various configurations. Also, the tests reveal that the sensitivity to small pitch changes was very low.

A variation of the inventive concept includes vortex generators actuated by electric or hydraulic motors to adjust their pitch angles which, thus, maintain optimum angles of attack under all flight conditions and aircraft weights. Control of the pitch angles would come from the aircraft flight control system. A further variant is flexible attachment of the vortex generators to the aircraft fuselage. Stiffeners of the attachment would be such that the correct angles of attack would be maintained in flight; but in takeoffs or landings, if the aircraft rotated too far, contact of the vortex generators with the ground would not cause any structural damage. The vortex generators are preferably made of durable materials such as glass-reinforced plastic, composites, or combinations of these with metal structures.

Various other changes may be made in the embodiments of the invention shown and/or described herein without departing from the scope of the invention as defined in the appended claims.

Having fully described my invention I claim:

1. In an aircraft having an upswept tail fuselage, the improvement comprising: a single vortex generator to reduce fuselage form drag positioned on each side of said fuselage near the break in the fuselage adjacent the beginning of the tail upsweep and adjacent the bottom of the fuselage to develop strong transverse outflow from the vertical plane of symmetry that relieves or delays the tendency to flow separation by acting on the external flow field while at the same time energizing the boundary layer to increase its resistance to separation.

2. An aircraft as recited in claim 1 in which each of said vortex generators is mounted forward of the break in said fuselage.

3. An aircraft as recited in claim 1 in which each of said vortex generators is mounted at the break in said fuselage.

4. An aircraft as recited in claim 1 in which each vortex generator comprises a fin extending substantially vertically from the surface of said fuselage.

5. An aircraft as recited in claim 1 in which at least one of said vortex generators is flexible.

6. An aircraft as recited in claim 1 in which at least one of said vortex generators is remotely controllable to vary the pitch thereof.

7. An aircraft as recited in claim 1 in which each fin has about a 2- to 4-foot span and is about 2 square feet in area.

8. An aircraft as recited in claim 1 in which each fin has about a 2-foot span from root to tip where the fuselage is approximately 200 feet long with effective diameters of about 20 to 30 feet.

9. An aircraft as recited in claim 1 in which said fin is triangular in shape.

10. An aircraft as recited in claim 1 in which the planform of the said fin is straight.

11. An aircraft as recited in claim 1 in which the planform of said fin is tapered.

12. An aircraft as recited in claim 1 in which the planform of said fin is reverse tapered.

13. An aircraft as recited in claim 1 in which said fin is shaped as an airfoil.

14. An aircraft as recited in claim 1 in which the configuration, size, and pitch of each of said vortex generators optimize reduction of fuselage form drag.

* * * * *